US006488451B1

(12) United States Patent
Hartman

(10) Patent No.: US 6,488,451 B1
(45) Date of Patent: Dec. 3, 2002

(54) DRIVE SHAFT LOCK

(75) Inventor: Robert L. Hartman, Sioux City, IA (US)

(73) Assignee: Snap-On Technologies, Inc., Lincolnshire, IL (US)

(*) Notice: Subject to any disclaimer, the term of this patent is extended or adjusted under 35 U.S.C. 154(b) by 0 days.

(21) Appl. No.: 09/801,403

(22) Filed: Mar. 7, 2001

(51) Int. Cl.[7] .............................................. B23B 45/00
(52) U.S. Cl. ........................ 408/124; 408/710; 409/134
(58) Field of Search .......................... 279/150; 408/124, 408/710; 409/182, 231, 134; 144/136.95, 154.5

(56) References Cited

U.S. PATENT DOCUMENTS 2,119,986 A * 6/1938 Dremel ....................... 279/150
2,211,216 A * 8/1940 Oster ............................ 15/23
2,716,555 A * 8/1955 Rowe ......................... 279/150
3,021,723 A * 2/1962 Happe ......................... 188/69
3,703,646 A 11/1972 Jacyno
3,872,951 A * 3/1975 Hastings, Jr. ................ 188/69
4,317,578 A 3/1982 Welch
4,358,230 A 11/1982 Rohlin
4,400,995 A * 8/1983 Palm .......................... 173/164
4,428,438 A 1/1984 Holzer
4,480,733 A 11/1984 Grimm et al.
4,489,525 A * 12/1984 Heck ........................... 188/69
4,635,502 A 1/1987 George
4,669,932 A 6/1987 Hartley
4,754,669 A 7/1988 Verdier et al.
4,804,048 A 2/1989 Porth, Jr.
4,974,475 A 12/1990 Lord et al.
5,191,968 A 3/1993 McCurry
5,277,527 A 1/1994 Yokota et al.
5,448,931 A 9/1995 Fossella et al.
5,624,013 A 4/1997 Tsai
5,732,805 A 3/1998 Nakamura
6,056,298 A 5/2000 Williams

* cited by examiner

*Primary Examiner*—Daniel W. Howell
(74) *Attorney, Agent, or Firm*—Seyfarth Shaw

(57) ABSTRACT

A drive shaft locking mechanism including a locking structure in the form of a gear which is secured to an input shaft of a rotary tool, a retractable interlocking mechanism which selectively couples to the locking structure, and a directional control mechanism coupled to the interlocking mechanism, controlling its movement. The locking structure comprises at least one engageable surface and a means for securing the locking structure to the input shaft. The interlocking mechanism includes a locking element slidably disposed within a tubular channel and selectively extensible therefrom at the urging of the directional control mechanism, to engage the locking structure along an engageable surface.

19 Claims, 4 Drawing Sheets

DRIVE SHAFT LOCK

BACKGROUND

This application relates generally to a locking mechanism for selectively preventing the rotation of a rotatable shaft. More particularly, this application relates to a locking mechanism for selectively preventing the rotation of a rotatable shaft within a rotary power tool, allowing for easier installation of accessories to the rotary tool.

Rotary tools are well known, and they are generally comprised of a motor coupled to at least one rotatable shaft, a tool holder or chuck coupled to the shaft, and a switch mechanism for selectively turning the motor on or off. In many rotary tools, a directional control is also coupled to the motor, in order to selectively control the direction in which the motor rotates the shaft. Drill bits or other attachments are received and secured by the chuck, enabling the rotary tool to be customized to perform a variety of different applications.

One problem common with a number of rotary tools involves securing drill bits or other attachments to the chuck. Typically, the chuck has a cavity in which the attachment is received and jaws surrounding the cavity to secure the attachment within the chuck. The jaws are positionable to secure or release an attachment by rotating the chuck about the shaft. However, since the shaft is typically freely rotatable when the drill is not activated, rotating the chuck about the shaft becomes quite difficult unless the shaft is locked in place while the chuck is rotated.

There are various mechanisms currently used to lock the shaft in place during tool attachment. A common mechanism for locking the shaft in place includes the use of a key which is attached to the chuck during the insertion or removal of an attachment. Disadvantages in these keyed chucks include the fact that the keys are easily lost or misplaced, and that they are often cumbersome to use. Some tools use a two-sleeve keyless chuck to insert or remove attachments to the rotary tool. Such keyless chucks often require the user to hold one sleeve to resist rotation of the shaft with one hand, while turning the chuck with the other. The two-sleeve keyless chuck has the disadvantage of needing two hands to operate. Also, the grip areas on each sleeve are typically small so that it is often difficult to generate sufficient torque to secure an attachment. Other rotary tools have complex mechanisms coupled to the trigger of the rotary tool, these mechanisms preventing the rotation of the shaft when the drill is not activated. Disadvantages in these devices may include a degradation of the drive motor due to the locking mechanism and the added expense of implementing the locking mechanism within the rotary tool.

While these and other methods may work for their intended purposes, significant improvement and innovation in a rotary tool design can still be achieved by the creation of a locking mechanism which is easy to activate and of simple design.

SUMMARY

Therefore, it is a general object of this application to provide a power tool with a locking mechanism which avoids the disadvantages of prior designs, while affording additional structural and operating advantages.

An important feature is the provision of a tool of the type set forth which is of simple construction and relatively economical to implement.

Another important feature is the provision of a rotary tool that avoids the accidental activation of the tool while the shaft is in the locking position.

Another important feature is the provision of a rotary power tool with a shaft locking mechanism which is easily activated.

A still further feature is the provision of a tool of the type set forth which minimizes the locking force required.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
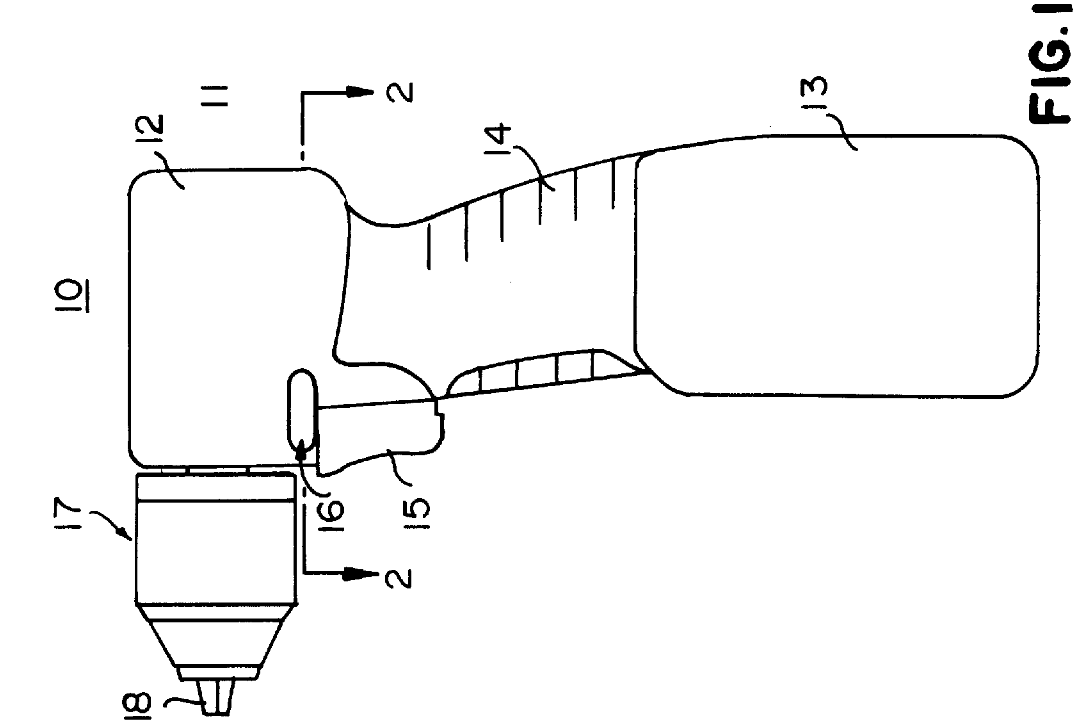
FIG. 1 is a side elevational view of a power tool having an embodiment of the subject shaft locking mechanism included therein.
Figure 4:
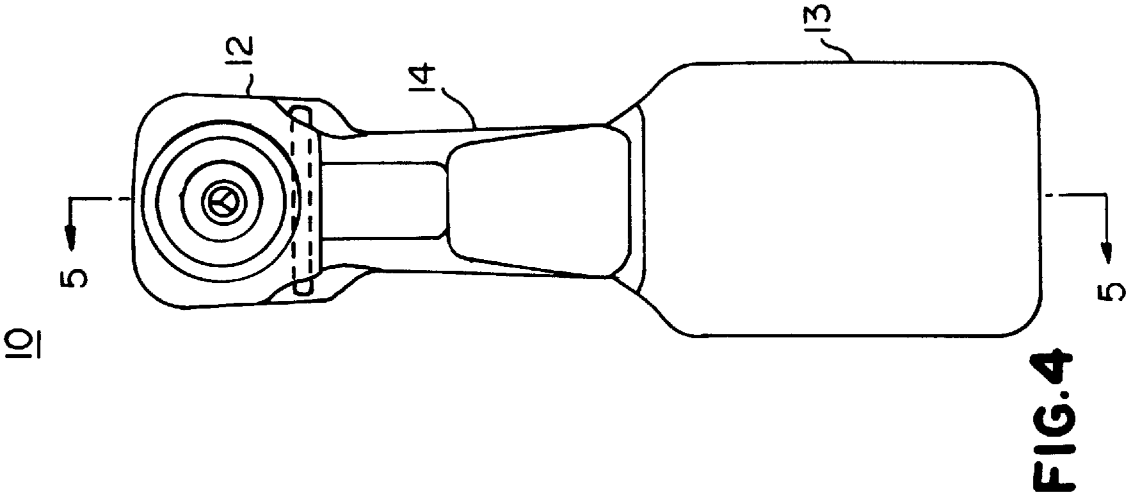
FIG. 4 is an front elevational view of the tool in FIG. 1.
Figure 2:
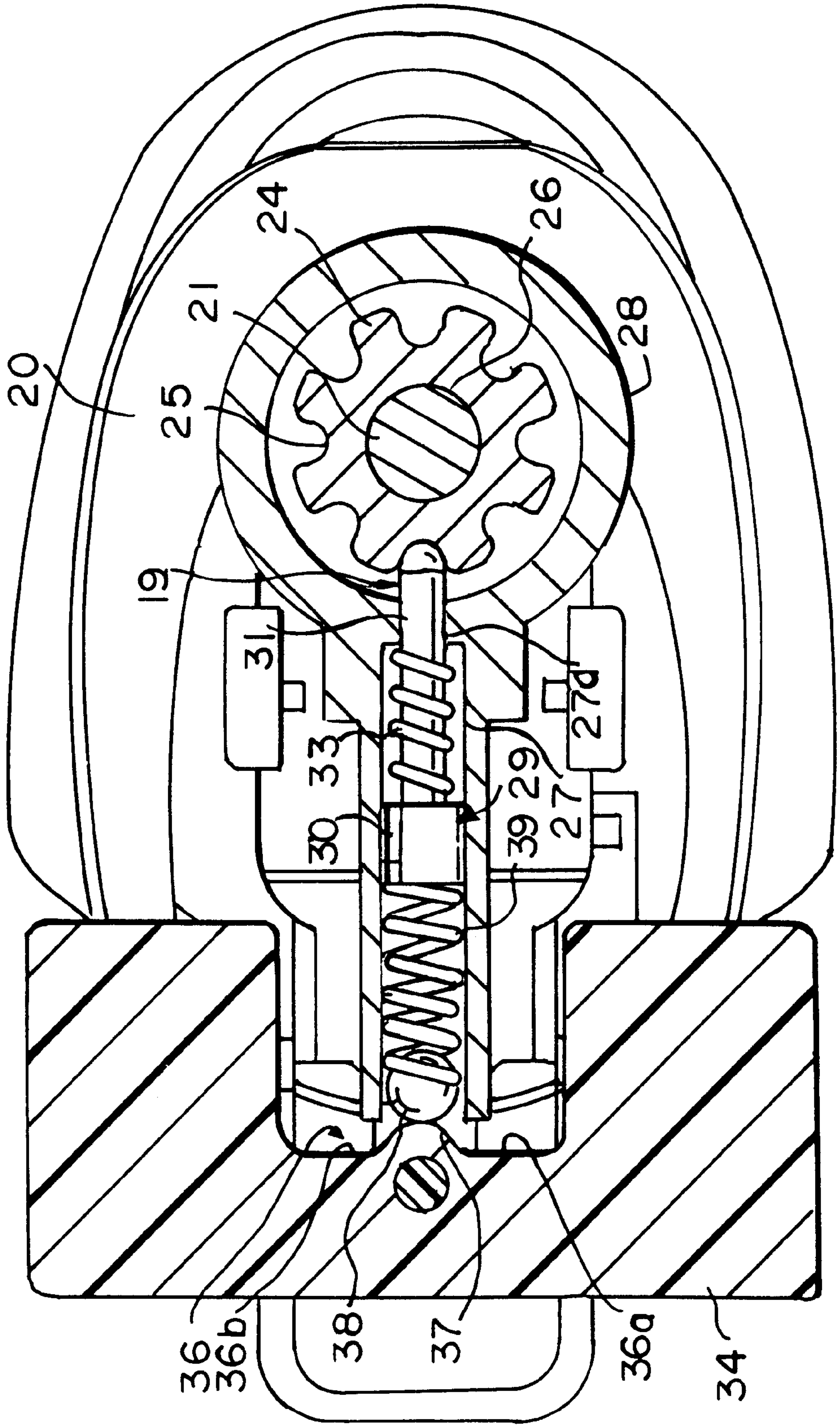
FIG. 2 is an enlarged, sectional view of the tool in FIG. 1 taken along line I—I disclosing an embodiment of the subject shaft locking mechanism in a locked position.
Figure 5:
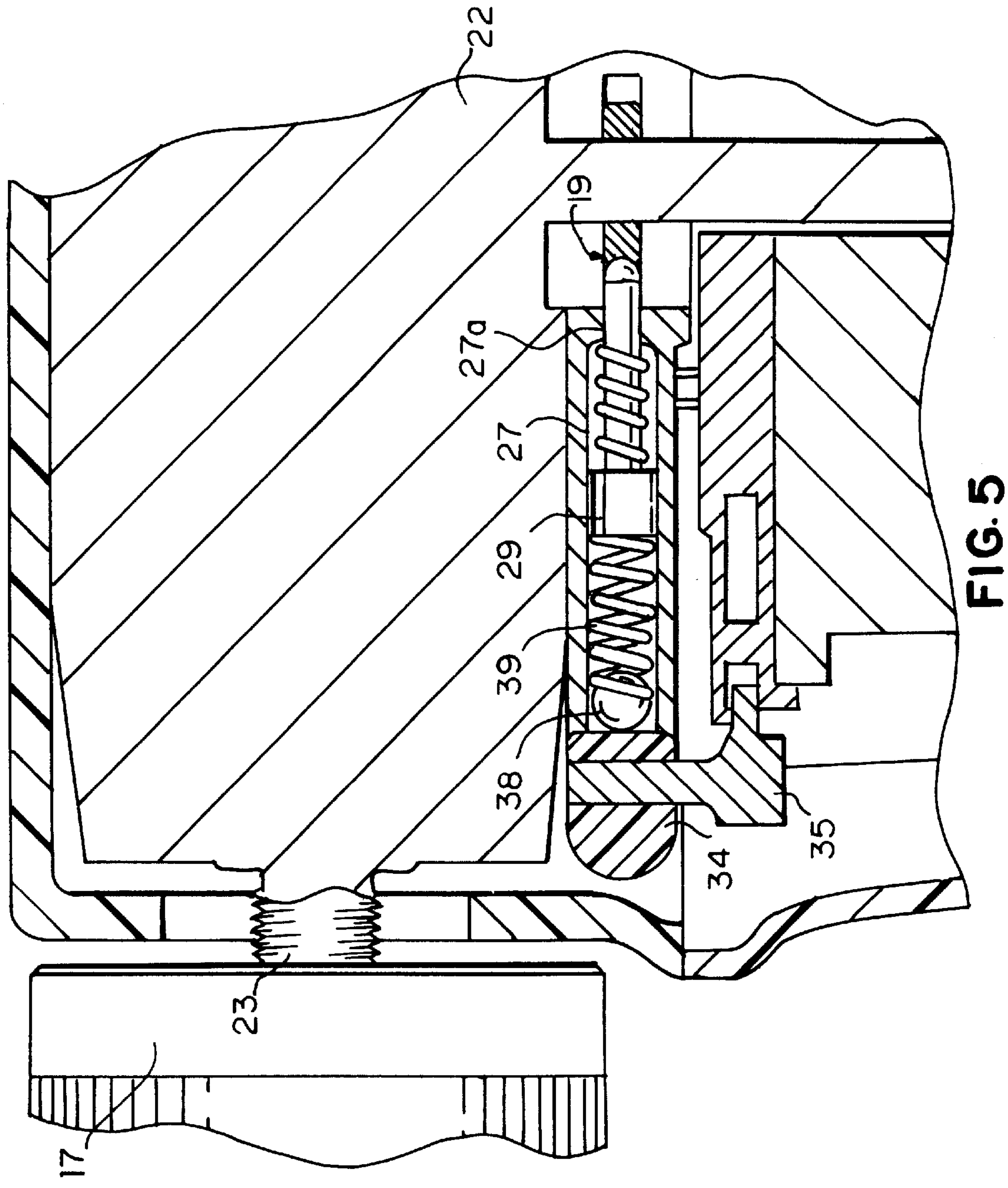
FIG. 5 is an enlarged, fragmentary, sectional view of the tool in FIG. 4 taken along line II—II disclosing additional structure.

Referring to FIGS. 1, 2, and 5, there is illustrated a rotary tool 10 with an embodiment of the subject drive shaft locking mechanism integrated therein. The rotary tool 10 includes a housing 11 which may include a top portion 12, a bottom portion 13 and a handle portion 14 therebetween. A trigger 15, for the activation of the rotary tool 10, projects forwardly from the handle portion 14. A directional control mechanism 16 may extend transversely across the top portion 12 at a point just above the trigger 15. A chuck 17 extends longitudinally from the top portion, with jaws 18 extending therefrom for securing an attachment.

In this embodiment of the rotary tool 10, a drive motor 20 is located within the lower portion 13 of the housing. An input shaft 21 is rotatively coupled to the drive motor 20, and extends from the drive motor 20 through the handle portion 14, eventually rotatively coupling to a gear box 22 (FIG. 5) located in the top portion 12 of the housing 11.

In the illustrated embodiment, an output shaft 23 is also rotatively coupled to the gear box 22, the output shaft 23 extending therefrom at an angle that is generally perpendicular to the longitudinal axis of the input shaft 21. The output shaft 23 extends from the top portion 12 of the housing 11, and is coupled to a chuck 30 for rotation thereof.

Referring to FIGS. 2 and 5, the drive shaft locking mechanism 19 includes a locking structure 24 in the form of a gear which is secured to the input shaft 21. The locking structure 24 should include at least one engageable surface 25 and a means for securing the locking structure to the input shaft 21. The locking structure 24 can be an annular gear with a plurality of U-shaped engageable surfaces 25 and an aperture 26 extending through the axial center of the gear. In one form, the input shaft 21 extends through the aperture 26 and is secured thereto, allowing the locking structure 24 to rotate with the input shaft 21.

The drive shaft locking mechanism 19 also includes a retractable interlocking mechanism which selectively couples to the locking structure 24, preventing the rotation thereof, and also preventing the rotation of the input shaft 21. The illustrated embodiment includes an interlocking mechanism comprised of a locking element slidably disposed within a tubular channel 27. The locking element is selectively extensible from the channel to engage the locking structure along an engageable surface 25. The directional control mechanism is coupled to the locking element, controlling its movement.

In the illustrated embodiment, the tubular channel 27 is adjacent to a cylindrical wall 28 surrounding the locking structure 24 coaxially therewith, channel 27 can be aligned perpendicular to the rotational axis of the input shaft. One end of the channel 27 is located adjacent to the locking structure 24 and is in communication with a passageway 27*a* through the cylindrical wall 28. The channel 27 is typically sized to provide bearing support to the sliding movement of the locking element.

The locking element can comprise a locking pin 29 with a head portion 30 and a leg portion 31. The leg portion 31 is extensible from the channel 27 and the passageway 27*a* so that a contact surface 32 on the leg portion 31 may engage the engageable surfaces 25 on the locking structure 24. While the locking element in this embodiment comprises a pin 29, it is also contemplated that other structures which can be selectively extensible from a channel to engage or disengage a locking structure, such as a tube or a ball may also be utilized A return spring 33 can be disposed within the channel 27 to bias the locking pin 29 into a disengaged position. The return spring 33 may be located within the channel 27 between the head portion 30 of the locking pin 29 and the cylindrical wall 28.

The directional control mechanism 16 may include a shuttle 34, and a lever 35 coupling the shuttle to the drive motor. The lever 35 is slidably movable along a path generally perpendicular to the longitudinal axis of the channel 27. The shuttle 34 is attached to the lever 35, and moves concurrently therewith. The shuttle 34 has a recess 36 found in the rear end thereof and a flange 37 projecting rearwardly centrally of the recess 36 and dividing it into lobes 36*a* and 36*b*. The channel 27 is received in the recess 36 and limits movement of the shuttle 34.

In this embodiment, the shuttle 34 is coupled to the locking pin 29 by a ball 38 and a spring 39 interposed between the two. The ball 38 and spring 39 are disposed within the channel 27 at an end adjacent to the shuttle 34. The ball 38 contacts the shuttle 34 in the recess 36 and on the flange 37. The spring 39 rests between the ball 38 and the head 30 of the locking pin 29, biasing the two apart.

Figure 3:
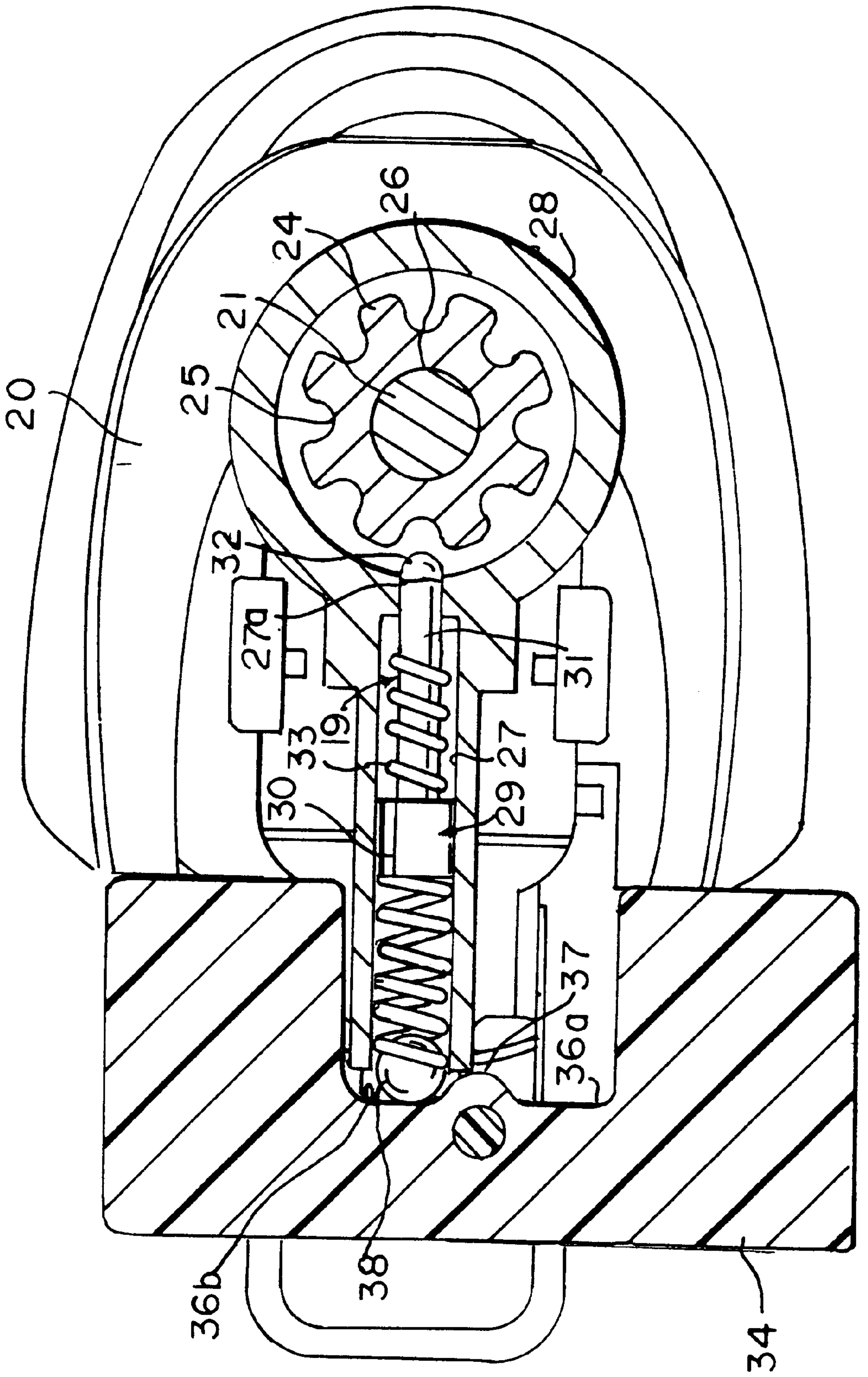
FIG. 3 is a view similar to FIG. 2 with the shaft locking mechanism in the unlocked position.

Referring to FIG. 3, when the shuttle 34 is in the clockwise or counterclockwise rotation position, the directional control mechanism 16 controls the drive motor 20 to rotate the input shaft 21 according to a corresponding direction. The springs 33 and 39 cooperate to bias the ball 38 into contact with the shuttle 34 at the bottom of the recess 36 so that when the ball 38 resides in either of the lobes 36*a* or 36*b*, the pin is withdrawn from engagement with the gear 24, allowing for rotation of the input shaft 21.

Referring to FIG. 2, when the shuttle 34 is moved to the locked position, intermediate the clockwise and counterclockwise positions, the directional control mechanism 16 disables the drive motor 20, preventing the activation thereof, and the flange 37 contacts the ball 38 displacing the ball 38 inward into the channel 27. In response, the spring 39 moves the pin 29 rearwardly to overcome the bias provided by the return spring 33 and compress it, allowing the pin 29 to move toward the locking structure 24. As a result, the leg portion 31 of the pin 29 extends from the channel 27 and through the passageway 27a to engage the locking structure 24 along an engageable surface 25. With the pin 29 engaged to the locking structure 24, the input shaft 21 is prevented from rotating about its longitudinal axis, thereby preventing the gear box 22 and the output shaft 23 from rotating as well.

The shaft locking mechanism can be coupled to the input shaft 21 ahead of the gear box 22 and, at this location, significantly less force is required to stop the rotation of the input shaft 21 than if the locking force were applied to the output shift 23. The gear box 22 creates additional torque on the output shaft 23, which must be overcome in order to prevent its rotation. However, it is also contemplated that an embodiment of the drive shaft locking mechanism could also be adapted to couple to an output shaft as well.

Referring to FIGS. 1 and 5, with the output shaft locked 23, the chuck 17 can be easily rotated relative to the shaft 23 to open or close the jaws 18 for mounting an attachment therein, or removing an attachment therefrom.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A rotary power tool comprising:

a drive motor;

a shaft rotatively coupled to the drive motor;

a locking structure secured to the shaft and including at least one engageable surface thereon;

a directional control mechanism coupled to the drive motor; and a retractable interlocking mechanism coupled to the directional control mechanism and including a locking element, movable in response to movement of the directional control mechanism between a locking position in engagement with the engageable surface on the locking structure for preventing the rotation of the shaft and a retracted position out of engagement with the engageable surface to permit rotation of the shaft.

2. The rotary power tool of claim 1, wherein the retractable interlocking mechanism includes a tubular channel located adjacent to and extending essentially perpendicular to the axis of rotation of the shaft, the locking element slidably disposed within the channel and extensible from the channel to engage the locking structure along an engageable surface.

3. The rotary power tool of claim 2, wherein the retractable interlocking mechanism includes a return spring disposed within the channel and engaged with the locking element for biasing the locking element to the retracted position.

4. The rotary power tool of claim 3, wherein the locking structure is relatively annular with an aperture extending therethrough, and a plurality of relatively U-shaped engageable surfaces extending circumferentially therearound.

5. The rotary power tool of claim 4, wherein the shaft extends through, and is secured within, the aperture in the locking structure.

6. The rotary power tool of claim 5, wherein the locking element comprises a pin with a head portion and a leg portion, the leg portion extensible from the channel to contact the locking structure and having a contact surface thereon to mate with the engageable surface on the locking structure.

7. The rotary power tool of claim 6, wherein the interlocking mechanism includes a ball movably disposed within the channel and partially extensible from a channel end opposite the locking structure, the ball coupled to the pin by a spring lying therebetween and displaceable by the directional control mechanism, wherein movement of the ball by the control mechanism produces a corresponding movement of the locking pin.

8. The rotary power tool of claim 7, wherein said directional control mechanism comprises a slidably positionable shuttle with a pair of recessed surfaces and a flange extending therebetween, the shuttle movable along a path generally perpendicular to the longitudinal axis of the channel, and contacting the ball along a recess or the flange.

9. The rotary power tool of claim 8, wherein the shuttle is slidably positionable among a clockwise, a counterclockwise, and a locked position, in the locked position the flange displacing the ball and driving the pin into engagement with the locking structure, in either a clockwise or counterclockwise position, a recess partially receiving the ball allowing the pin to be retracted by the return spring.

10. The rotary power tool of claim 9, wherein the rotary tool is comprised of an input shaft rotatably coupled to the drive motor, and an output shaft rotatively coupled to the input shaft, the input shaft disposed within and secured to the aperture through the locking structure.

11. A rotary power tool comprising:

a drive motor;

an input shaft rotatively coupled to the drive motor;

a locking gear secured to the input shaft;

a directional control mechanism including a slidably positionable shuttle coupled to the drive motor; and a retractable interlocking mechanism coupled to the directional control mechanism, the interlocking mechanism including a tubular channel extending essentially perpendicular to the axis of rotation of the input shaft, a locking pin slidably disposed within the channel and extensible from the channel to engage the locking gear in an engaged position, preventing the rotational movement thereof, a return spring disposed within the channel and coupled to the locking pin, the return spring biasing the locking pin to a disengaged position, and a ball movably disposed within the channel and partially extensible therefrom at an end opposite to the locking gear, the ball coupled to the locking pin and displaceable by the directional control mechanism, wherein displacement of the ball by the directional control mechanism results in a respective movement of the locking pin between the engaged and disengaged positions.

12. A rotary power tool comprising:

a drive motor;

an input shaft rotatively coupled to the drive motor;

an output shaft;

a gear mechanism coupling the input shaft to the output shaft;

a locking structure coupled to the input shaft; and an interlocking mechanism selectively movable between a locking position in engagement with the locking structure for preventing the rotation of the input shaft and a retracted position out of engagement with the locking structure to permit rotation of the shaft, wherein the interlocking mechanism includes a tubular channel extending essentially perpendicular to the axis of rotation of the shaft, a locking pin slidably disposed within the channel and extensible from the channel to engage the locking structure, preventing the rotational movement thereof, a return spring disposed within the channel and coupled to the locking pin for biasing the locking pin to a disengaged position, and a ball movably disposed within the channel and partially extensible therefrom at an end opposite the locking structure, the ball coupled to the locking pin.

13. A rotary power tool comprising:

a drive motor;

an input shaft rotatively coupled to the drive motor;

an output shaft;

a gear mechanism coupling the input shaft to the output shaft;

a locking structure coupled to the input shaft; and an interlocking mechanism selectively movable between a locking position in engagement with the locking structure for preventing the rotation of the input shaft and a retracted position out of engagement with the locking structure to permit rotation of the shaft; and a directional control mechanism coupled to both the interlocking mechanism and the drive motor, wherein the directional control mechanism controls respective movement of the interlocking mechanism between the engaged and disengaged positions.

14. The rotary power tool of claim 13, wherein the directional control mechanism comprises a slidably positionable shuttle with a pair of recessed surfaces and a flange extending therebetween, the shuttle slidably communicating with the interlocking mechanism along a recess or the flange.

15. The rotary power tool of claim 14, wherein the shuttle is slidably positionable among a clockwise, a counterclockwise, and a locked position, in the locked position the flange urging the interlocking mechanism into engagement with the locking structure, in either a clockwise or counterclockwise position a recess allowing the interlocking mechanism to be disengaged from the locking structure.

16. The rotary power tool of claim 11, wherein the ball is coupled to the locking pin by a spring positioned therebetween.

17. The rotary power tool of claim 11, wherein the shuttle includes a pair of recessed surfaces and a flange extending therebetween, the shuttle contacting the ball along a recess or the flange.

18. The rotary power tool of claim 11, wherein the shuttle is slidably positionable among a clockwise, a counterclockwise, and a locked position, in the locked position the flange contacting and displacing the ball within the channel urging the locking pin to the engaged position, and in either the clockwise or counterclockwise position, a recess partially receiving the ball and allowing the pin to be displaced by the return spring to the disengaged position.

19. The rotary power tool of claim 18, wherein the shuttle is slidable along a path relatively perpendicular to the longitudinal axis of the channel.

* * * * *